Jan. 26, 1954

J. E. WHITFIELD 2,667,048

DRIVE CONNECTION

Filed Feb. 23, 1950

INVENTOR.
JOSEPH E. WHITFIELD
BY
Otto Moeller
Attorney

Jan. 26, 1954

J. E. WHITFIELD 2,667,048

DRIVE CONNECTION

Filed Feb. 23, 1950

INVENTOR.
JOSEPH E. WHITFIELD
BY
Otto Moeller
Attorney

Patented Jan. 26, 1954

2,667,048

UNITED STATES PATENT OFFICE 2,667,048

DRIVE CONNECTION

Joseph E. Whitfield, Erie, Pa., assignor to Read Standard Corporation, a corporation of Delaware Application February 23, 1950, Serial No. 145,876

1 Claim. (Cl. 64—4)

My invention relates to drive connections wherein the drive shaft of the motive power is offset from the operating shaft of a device, as contrasted to a direct drive connection between the source of power and the operating shaft.

An object of the invention is to provide a drive connection of the type specified that is applicable to a relatively short extension of the operating shaft from the body of the device, and that is interchangeable with a direct drive connection without alteration of the operating shaft of the device.

Another object is to provide an improved drive connection embodying a slip type coupling affording simple and convenient assembly and disassembly.

Further objects of the invention contemplates the provision of a pulley and belt or similar drive connection for the operating shaft of a device wherein the operating shaft is relieved of forces exerting a bending strain thereon; wherein the bearings supporting the operating shaft in the device are relieved of strains incident to pull of the pulley belt; and wherein side thrust on the drive connection coupling by the pulley bearing is eliminated.

Still another object resides in the provision of a lubricating system for the drive connection integral with the lubricating system of the device being driven.

Other objects and advantages of the invention such as the mounting of the drive connection and the novel combination and arrangement of parts, will become apparent from the following detailed description, reference being had to the accompanying drawings. On these drawings, which illustrate the invention as applied to an axial flow screw type blower, Figure 1 is a side elevation of the drive connection as applied to an axial flow type blower;

Figure 1:
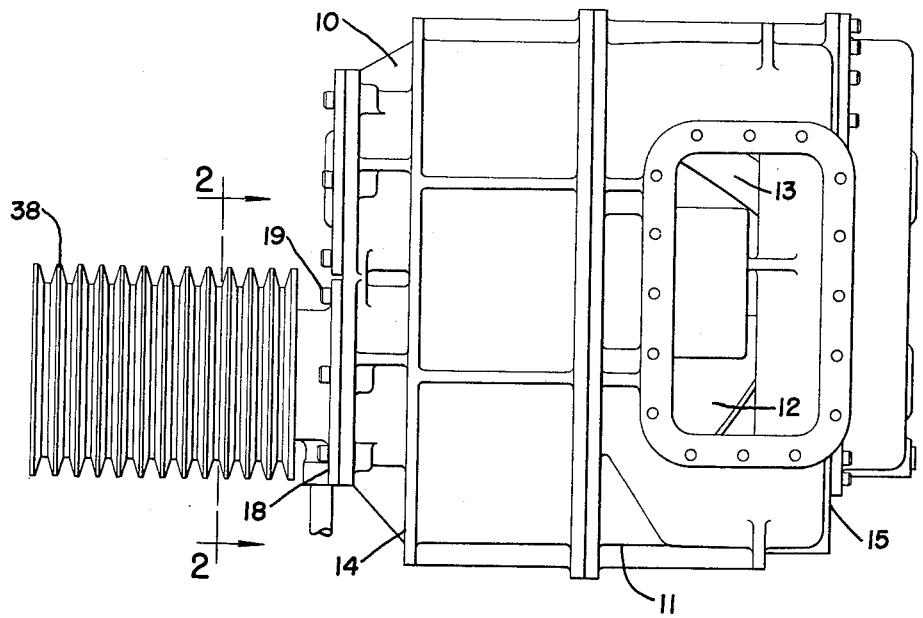

In the drawings the drive connection is shown as applied to the rotor shaft of an axial flow screw type blower, as exemplified in my United States Letters Patent No. 2,287,716. However, it is apparent that the invention is equally adaptable to devices in general having a rotatable operating shaft.

Referring to Figure 1, the numeral 10 designates an axial flow screw type blower of the type shown in my patent, referred to above. The blower 10 comprises a housing 11 in which are mounted intermeshing main or male rotor 12 and gate or female rotor 13. The housing 11 is provided with end walls 14 and 15 in which are mounted bearing assemblies (not shown) for the shafts of the rotors 12 and 13.

Figure 3:
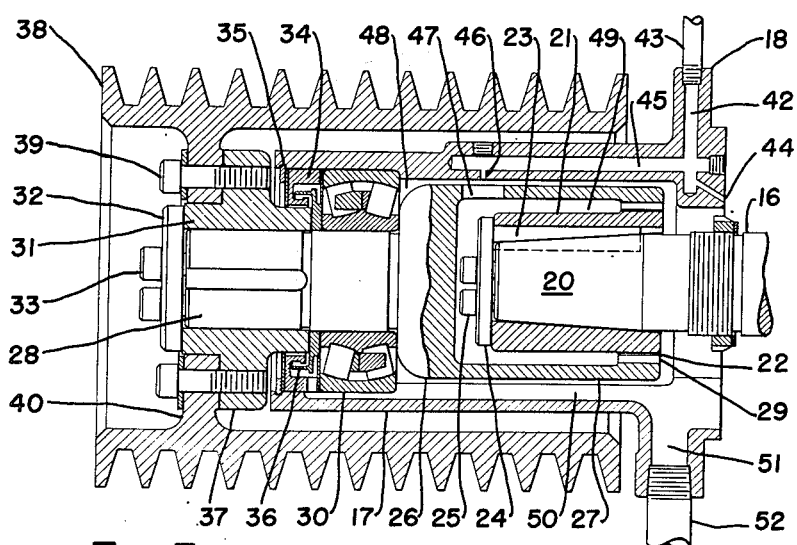
Figure 3 is a sectional view taken on the line 3—3 of Figure 2.

One end of the shaft 16, Figure 3, of the rotor 12 extends beyond the end wall 14 and is arranged to be connected to any suitable source of power (not shown) for rotating the shaft 16.

The improved drive connection constituting my invention is mounted with and supported by the blower housing 11 and comprises a cylindrical support member 17 integrally formed with end cover 18 which fits about the shaft 16 and forms a closure for its bearing assembly. Any suitable means, as bolts 19, rigidly secure the end cover 18 to the housing end wall 14.

The portion of shaft 16 projecting beyond the housing 11 extends axially within the cylindrical support member 17 and is formed with a tapered end portion 20 terminating considerably short of the outer end of the member 17. Arranged for a slip fit over the tapered shaft portion 20 is a hub 21 provided at its inner end with an integrally formed involute external spline 22. The spline 22 and shaft 16 are held in driving engagement by means of a key 23 fitting in complementary longitudinal keyways in the outer and inner surfaces, respectively, of the tapered shaft portion 20 and the hub 21. A clamp plate 24, fitting over the outer ends of the hub 21 and the tapered shaft portion 20, is secured to the latter by means of cap screws 25 which together with the tapered engaging surfaces of the shaft portion 20 and hub 21 of spline 22, prevents relative longitudinal displacement of the spline 22 with respect to shaft 16.

An adapter shaft 26 in axial alinement with shaft 16 forms an extension of the latter and is operatively connected with it in the manner herewith set forth. The adapter shaft 26 comprises an inner enlarged hollow open ended shaft section 27 disposed wholly within the cylindrical support member 17 and encompassing the hub member 21. The outer shaft section 28 of adapter shaft 26 has a considerably smaller diameter than shaft section 27 and a portion of it extends into the cylindrical support member 17 and a portion of it projects outwardly beyond the member 17.

The enlarged shaft section 27 is formed adjacent its open end with an internal involute spline 29 meshing with the spline 22.

Adapter shaft 26 is mounted in roller bearing 30 carried by the cylindrical support member 17. Roller bearing 30 is disposed about the smaller diameter shaft section 28 adjacent the enlarged section 27. Keyed on the outer portion of the shaft section 28 is a pulley hub 31 providing for driving engagement therebetween. A clamp plate 32 fitting over the outer ends of the hub 31 and adapter shaft 26, is secured to the latter by means of cap screws 33, whereby accidental longitudinal movement of hub 31 outwardly along shaft section 28 is prevented while at the same time providing for convenient assembly.

A portion of the hub 31 extends into the cylindrical support member 17 and disposed therebetween is a labyrinth sealing ring 34 held in place by a snap ring 35. An oil slinging disc 36 is disposed on the shaft section 28 and is held between the inner race of the bearing 30 and the end of the pulley hub 31, whereby it will rotate with the shaft.

The pulley hub 31 is provided with a radially extending flange 37 to which a pulley 38 is securely fastened by means of bolts 39 extending through the internal radial flange 40 into the mating flange 37 of pulley hub 31. The pulley 38 is connected by suitable belting (not shown) with a source of power (not shown) whereby through the drive connection described power is transmitted to rotor shaft 16. It is apparent that the entire weight of the pulley and any strains incident to a pulley drive are by the driving connection described, transmitted to the blower housing. The novel driving connection also provides for transmitting power from a drive pulley to a comparatively short rotor shaft extension and it is easily assembled or disassembled.

In order to provide for lubrication of the driving connection, the upper portion of the end cover 18 is provided with a downwardly extending passage 42 connected in any suitable manner with the oil reservoir (not shown) for the blower, as by the tube 43. A passage 44 of smaller diameter than passage 42 communicates with the lower end thereof and directs oil to a bearing (not shown) for the rotor shaft 16. A horizontally extending passage 45, also communicating with the lower end of passage 42, is formed in the upper portion of the cylindrical support member 17 through which oil will pass to a downwardly directed orifice 46.

Figure 2:
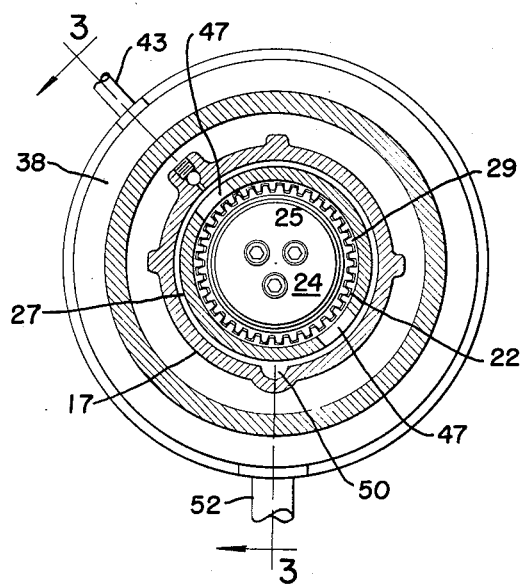
Figure 2 is a sectional view taken on the line 2—2 of Figure 1.

The enlarged hollow section 27 of adapter shaft 26 is provided with a pair of diametrically opposed openings 47, as best shown in Figure 2, and disposed as shown in Figure 3 to alternately communicate with the oil discharge orifice 46 during rotation of the adapter shaft 26. Thus, a portion of the oil discharged from orifice 46 will be supplied to the bearing 30 through the space 48 between the inner and outer walls, respectively, of the cylindrical support member 17 and the enlarged shaft section 27 and a portion will be supplied to the splines 22 and 29 through the space 49 between inner and outer walls, respectively, of the hollow shaft section 27 and hub 21. A groove 50 formed in the lowermost portion of the cylindrical support member 17 provides a passage for excess oil to the drain passage 51 in the end cover 18. A drain pipe 52 communicating with the drain passage 51 leads oil back to the oil reservoir (not shown). The passage 51 also forms a drain for excess oil from the rotor shaft bearing (not shown).

Figure 4:
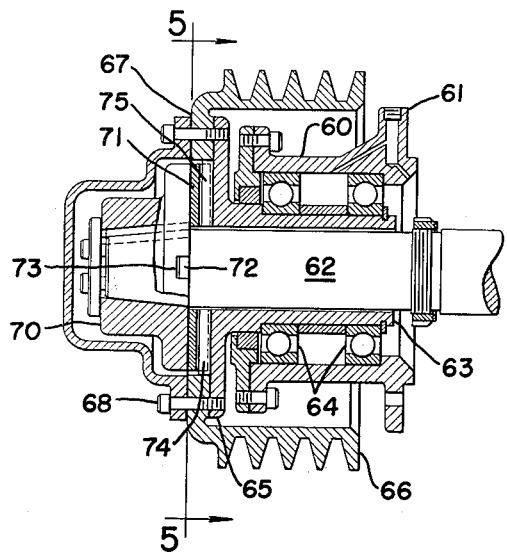
Figure 4 is a vertical central sectional view through a modified form of drive connection.
Figure 5:
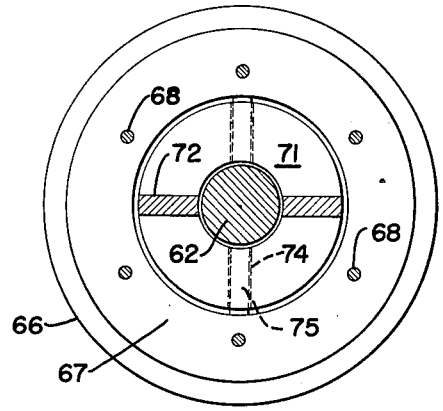
Figure 5 is a sectional view taken on the line 5—5 of Figure 4.

In Figures 4 and 5 is shown a modified form of the invention. In this form of the invention, as in the preferred form, the rotor shaft is entirely relieved of the weight and any strains incident to the pulley drive.

A cylindrical support member 60 integrally formed with a cover 61 surrounds the shaft extension 62. A sleeve-like hollow shaft member 63 surrounding the shaft extension 62 is mounted for rotation in bearings 64 which are carried by the cylindrical support member 60.

The member 63 is provided with a radial flange 65 at its outer end beyond the end of the support member 60. A pulley 66 extends about and beyond the support member 60 and is provided at its outer end with an annular inwardly extending flange 67 arranged to mate with the radial flange 65. Suitable means, as bolts 68, extending through the mating flanges 65 and 67 rigidly secure the pulley 66 with the member 63, which in turn is, as previously described carried by the support member 60.

The outer end portion of the shaft extension 62 is tapered, as at 69, and keyed thereon is a hub 70. Between the adjacent ends of the hub 70 and sleeve member 63 and fitting loosely about the shaft 62 is an annular plate 71. The plate 71 is provided on one face with diametrically extending rib 72 arranged to be engaged in a corresponding groove 73 in the adjacent end face of the hub 70. The opposite face of the plate 72 is provided with a diametrically extending groove 74, at right angles with respect to the rib 72, which is arranged to receive a diametrically extending rib 75 on the adjacent end face of the sleeve member 63. There is thus provided a self aligning driving connection.

I claim:

A pulley drive connection for an operating shaft projecting from the housing of a device actuated by said shaft, comprising a cylindrical support member adapted for attachment to said housing surrounding said shaft projection, a pulley surrounding said support member, a bearing carried by said cylindrical support member and an adapter shaft journaled in said bearing, means for securing said pulley to said adapter shaft, a driving connection between said adapter shaft and said operating shaft projection, and a common lubricating system for said device and said bearing and driving connection comprising a lubricant inlet and outlet in said support member and lubricant feed passages in said support member providing communication between said inlet and said device and said bearing and driving connection, and lubricant discharge passages in said support member providing communication between said outlet and said device and said bearing and driving connection.

JOSEPH E. WHITFIELD.

References Cited in the file of this patent

UNITED STATES PATENTS

| Number | Name | Date |
| --- | --- | --- |
| 1,709,480 | Lyford | Apr. 16, 1929 |
| 1,947,796 | Radford | Feb. 20, 1934 |
| 2,489,642 | Hesse | Nov. 29, 1949 |
| 2,518,481 | Maguire | Aug. 15, 1950 |